United States Patent [19]

McDaniel et al.

[11] 3,957,623

[45] May 18, 1976

[54] STABLE, CATALYTICALLY ACTIVE AND COKE SELECTIVE ZEOLITE

[75] Inventors: Carl Vance McDaniel, Laurel; John Storey Magee, Jr., Cooksville, both of Md.

[73] Assignee: W. R. Grace & Co., New York, N.Y.

[22] Filed: Apr. 24, 1974

[21] Appl. No.: 463,611

[52] U.S. Cl. ............................ 208/120; 252/455 Z; 423/328
[51] Int. Cl.² .................... B01J 29/12; C10G 11/02
[58] Field of Search ......................... 208/120

[56] References Cited
UNITED STATES PATENTS

| | | | |
|---|---|---|---|
| 3,393,147 | 7/1968 | Dwyer et al. | 208/120 |
| 3,402,996 | 9/1968 | Maher et al. | 423/328 |
| 3,462,377 | 8/1969 | Plank et al. | 252/455 Z |
| 3,533,939 | 10/1970 | Coonradt | 208/135 |
| 3,595,611 | 7/1971 | McDaniel et al. | 423/328 |
| 3,676,368 | 7/1972 | Scherzer | 252/455 Z |
| 3,816,342 | 6/1974 | Plank et al. | 252/455 Z |
| 3,823,092 | 7/1974 | Gladrow | 252/455 Z |
| 3,835,032 | 9/1974 | Dolbear et al. | 208/120 |

*Primary Examiner*—Delbert E. Gantz
*Assistant Examiner*—G. E. Schmitkons
*Attorney, Agent, or Firm*—Giedre M. McCandless

[57] ABSTRACT

A stable rare earth exchanged zeolite having high catalytic activity and improved coke selectivity is prepared by a series of exchange steps whereby the rare earth is introduced into the zeolite in a multi-step e.g., two step manner. The method comprises exchanging a sodium zeolite to less than 4.0 weight percent $Na_2O$, exchanging with rare earth to give an initial rare earth oxide content of 0.3 to 5 weight percent, calcining, and further rare earth exchanging the zeolite to give a final rare earth content of 1.0 to 10 weight percent.

4 Claims, No Drawings

STABLE, CATALYTICALLY ACTIVE AND COKE SELECTIVE ZEOLITE

BACKGROUND OF THE INVENTION

This invention relates to crystalline aluminosilicate zeolites, particularly to faujasite type zeolites and more specifically to rare earth exchanged faujasetic crystalline zeolites, preparation thereof and use as a catalyst particularly as a cracking catalyst.

Rare earth exchange crystalline zeolites have been prepared by prior art methods which generally involve ion exchange procedures in which the introduction of the desired rare earth metal into the zeolites is accomplished by a conventional single step, such as disclosed in U.S. Pat. No. 3,595,611. The latter rare earth exchanged zeolites possess catalytic activity and selectivity particularly when utilized as a cracking catalyst component.

As a result of this invention, it has been found that novel rare earth exchanged crystalline aluminosilicate zeolites having superior catalytic properties compared to other prior art rare earth exchanged zeolites, can be prepared by an ion exchange method which incorporates the rare earth into the zeolite in a multi step, particularly a two step manner. We have discovered that if the desired amount of the rare earth metal is introduced into the zeolite via a unique two step exchange procedure, the resulting zeolite exhibits an unexpected high degree of catalytic activity and good selectivity, particularly highly improved coke selectivity.

BRIEF STATEMENT OF THE INVENTION

In summary, the process for preparing the improved rare earth exchanged zeolites involves a serites of ion exchange treatments and calcination procedures. Broadly, the process includes the steps of exchanging a faujasite type zeolite, e.g. a faujasite-type Y zeolite in the sodium form with a hydrogen-containing cation such as an ammonium ion to reduce the original sodium metal content of the zeolite to less than about 4 weight percent, followed by the first step of the series of ion-exchange steps with a rare earth salt to impart an initial rare earth content of about 0.3 to 5 percent by weight to the zeolite. After subsequent filtering and washing of the thus exchanged zeolite, drying and calcination of the zeolite is conducted at a temperature of from about 700° to 1650°F. Thereafter the product is further exchanged with a solution containing rare earth salts, for instance a mixed solution containing rare earth cation salts and an ammonium salt to decrease the sodium oxide content below about 1.0 weight percent and to import a total rare earth content of about 1.0 to 10 percent by weight of the zeolite. After washing and drying the novel zeolite product is recovered.

DETAILED DESCRIPTION OF THE INVENTION

We have found that faujasitic zeolites, particularly those possessing a high silica content, prepared according to the process of the instant invention when utilized in hydrocarbon conversion processes, exhibit an unusually high degree of catalytic activity and selectivity compared to zeolites of similar composition in which the rear earth metal is introduced in a conventional one step manner. This result is a saving of rare earth which is an expensive component of catalysts.

The novel multi-step incorporation of metal cation, specifically the rare earth metal into a zeolitic structure is applicable to any crystalline aluminosilicate zeolitic material. Thus when it is desired to use a rare earth exchanged zeolite in hydrocarbon cracking processes, a zeolite suitable as a starting material is one having pores sufficiently large for the entry of the molecule to be catalyzed such as a Y-type faujasite for large molecule hydrocarbon conversion.

It is well known that faujasite is a naturally occuring aluminosilicate having a characteristic X-ray structure. The synthetic materials designated zeolite X and zeolite Y by the Linde Division of Union Carbide Corporation are common examples of synthetic faujasites. U.S. Pat. No. 3,130,007 which describes Y zeolites, and gives the chemical formula as follows:

$$0.9 \pm 0.2 \ Na_2O:Al_2O_3:wSiO_2:xH_2O$$

where $w$ has a value of greater than 3 and up to about 6 and $x$ may have a value as high as 9.

Suitable zeolitic starting materials in the subject process are high silica faujasites such as the afore described zeolite Y. Preferably a synthetic faujasite material having a silica to alumina ration between 3.2 and 7.0 is utilized.

The various faujasitic zeolites having the desired silica content are either commercially available materials or can be prepared according to conventional methods well known in the art.

The high silica synthetic faujasite is normally in the sodium form. However if desired, any alkali metal form e.g. potassium may be utilized. As used herein the term "alkali metal" includes the elements of Group I-A, lithium through cesium.

According to the first step of our process the suitable faujasite is base exchanged to replace most of the alkali metal e.g. sodium ions with a cation which upon thermal decomposition leaves an appreciable portion of the zeolite in the hydrogen form, such as solutions containing ammonium salts, amine salts or other suitable salts. Examples of suitable ammonium compounds of this type include ammonium chloride, ammonium sulfate, tetraethyl ammonium chloride, tetraethyl ammonium sulfate, etc. Ammonium sulfate, because of its ready availability and low cost, is the preferred reagent in this step of the process.

The replacement of the sodium ions by ammonium ions by base exchange with ammonium salt facilitates the subsequent incorporation of the desired rare earth cations into the zeolite structure due to the greater ease of exchange-ability of rare earth cations with ammonium and/or hydrogen ions, as contrasted to alkali metal cations.

The initial ammonium exchange procedure can be accomplished in a single step or a series of base exchange steps. The treated zeolite is filtered after each ammonium exchange step, prior to treatment with a fresh ammonium exchange solution. The ammonium exchange step may be repeated until the original alkali metal content is reduced to about 2.0 to 5.0, weight percent, preferably to 3.0 to 4.0 percent and more particularly below about 3.5 percent. As used herein the term "alkali metal or rare earth content" refers to the weight percent of the respective cations, expressed as alkali metal oxide or rare earth oxide (REO) respectively.

Temperatures during the base exchange step may vary from room temperature to elevated temperatures below the boiling point of the treating solution. Generally temperatures from about 25° to about 110°C and preferably from about 80° to 100° may be employed. The exchange is essentially complete in a period of about 0.1 to 2 hours, and usually from 0.1 to 0.5 hours.

After completion of the ammonium exchange, the zeolite is filtered and the zeolite is then ion-exchanged with a rare earth salt solution in concentration sufficient to provide an initial rare earth content of about 0.1 to 6.0 percent by weight to the zeolite, preferably from about 0.3 to 5.0 weight percent.

As used herein the term "rare earth elements" include elements from lanthanum to lutecium, atomic numbers 57 to 71 inclusive. A large variety of rare earth compounds may be employed as a source of rare earth ions, the only limitation being that the rare earth salt be sufficiently soluble in the solvent, usually water, to provide the required amount of rare earth content of the zeolite. Suitable compounds include but are not limited to rare earch chlorides, nitrates, sulfates, formates, etc. The rare earth salts may be employed as single rare earth metal or a mixture of rare earth cations, such as rare earth chlorides or didymium chloride.

A suitable source or rare earth ions are commercially available rare earth chloride solutions containing chlorides of rare earth mixtures, having the relative composition cesium (as $CeO_2$) — 48%; lanthanum (as $La_2O_3$) — 24%; praseodymium (as $Pr_6O_{11}$) — 5%; neodymium (as $N_2O_3$) — 17%; samarium (as $Sm_2O_3$) — 3%; gadolinium (as $Gd_2O_3$) — 2% and other rare earth oxides — 0.8%.

If desired, the rare earth ion exchange step may be carried out with a solution containing mixtures of rare earth salt and other cation salts such as cations of ammonium, magnesium, aluminum, nickel, iron, chromium etc.

The conditions at which the rare earth exchange is conducted may be the same as those employed in the ammonium exchange step. Satisfactory results are attained if the rare earth exchange is conducted at a temperature from about 50° to 100°C for a period of about 0.1 to 3.0 hours.

It is to be noted that the aforedescribed ammonium exchange steps and the rare earth exchange step may be combined in a single exchange step. Generally, the rare earth salt solution is added to the final ammonium exchange solution.

The ammonium and rare earth exchanged zeolite product is then filtered and washed free of excess salts, dried and calcined at a temperature from about 700° to 1650°F preferably from 800° to 1500°F, for a period from about 0.1 to 0.3, preferably from 0.1 to 0.2 hours. During the calcination step the ammonium ions in the zeolite structure are liberated as ammonia gas and the calcination causes an internal rearrangement or transfer which facilitates any subsequent ion exchange of the alkali metal ion remaining within the zeolite structure.

Thus in the final exchange step, the calcined zeolite is further exchanged to reduce the alkali metal oxide content of final zeolite product to below about 1.0 weight percent, preferably less than 0.5 weight percent; and to incorporate additional rare earth cations to give a total rare earth oxide content of about 1.0 to 10 weight percent.

It is to be noted that the final exchange step which accomplishes two purposes can, if desired, be carried out by a series of treatments or a combination of cations as long as the reduction of alkali metal oxide content and the incorporation of the desired rare earth content is attained.

Thus the zeolite can be further subjected to ammonium exchange procedures as previously described in the initial steps of our process whereby the original alkali metal content was reduced by ammonium exchange steps to the desired value. Thereafter the zeolite is further exchanged with a rare earth salt e.g. chloride solution under conditions similar to those described in previous rare earth exchange steps. The rare earth exchange and reduction of alkali metal oxide content can be carried out with a mixed solution containing the rare earth salts and other cation salts such as magnesium, aluminum, iron, calcium, etc.

Alternatively, the alkali metal oxide content can be reduced to the final required level and the desired rare earth content can be achieved by employing a mixture of ammonium and rare earth salts or an admixture of ammonium, rare earth salts and other metal cation salts in a single final exchange step.

Furthermore the final rare earth content can be imparted to the zeolite with a reduction of the sodium oxide content by subjecting the zeolites to a multi-step procedure whereby the calcined zeolite is first subjected to a single or series of ammonium exchanges, followed by a rare earth exchange, further ammonium exchanges and a subsequent rare earth exchange.

After the final rare earth exchange the zeolite is filtered, washed and dried and the novel zeolite product is obtained. It has been found that the novel stabilized rare earth exchange zeolites of this invention exhibiting improved catalytic activity and selectivity are obtained if a starting zeolite material is subjected to a series of exchange steps in which the rare earth content is introduced into zeolite in at least a two step manner.

Our zeolite has an X-ray diffraction pattern similar to faujasite. The X-ray diffraction pattern was determined using a Norelco X-ray diffractometer with a nickel filter copper K radiation. The instrument was operated at 40 kv. operating potential and 20 ma. The sample to be run was mixed with 10% of a suitable inert internal standard, such as sodium chloride and scanned from about 5° two-theta to about 50° two-theta at a goniometer speed of ½° per minute and a chart speed of ½ inch per minute.

The observed and theoretical (from National Bureau of Standards Circulars) values for the internal standard were used to correct systematic errors in the observed value to two-theta.

As mentioned above, or rare earth exchanged zeolite prepared according to our novel process exhibits superior catalytic activity and selectivity as compared to other rare earth zeolites of similar composition. Our rare earth zeolite catalysts exhibit exceptionally good ability to optimize desired yield of gasoline and other valuable petroleum derivatives from cracking of gas oil boiling in the 400°–1000° F range.

The cracking is carried out at a temperature of 800° to 1050°F, a catalyst to oil ratio of 3–6 and a contact time of 0.5 seconds to 10 minutes. The preferred operating conditions are a temperature of 850°–950°F a catalyst to oil ratio of 4.0 to 5.0.

The improved coke selectivity of our zeolite catalysts is manifested by low coke yields. Coke which is a mixture of high molecular weight hydrogen deficient polymers and carbon formed in the reactor, plus any unstripped oils present on the catalyst as it enters the regenerator is an undesirable side product obtained in hydrocarbon conversion processes.

Our rare earth exchanged zeolites may be formed into catalysts using a minimum or substantially no binders so as to provide a catalyst which comprises essentially 100 percent zeolite. Alternatively, 5 to 50 weight percent of the combination of zeolites may be combined with from about 50 to 95 percent by weight inorganic oxide matrix. Typical inorganic oxide matrixes include silica, alumina, and silica-alumina hydrogels. It is also contemplated that the matrix may comprise or contain clay such as kaolin and chemically or thermally modified kaolin.

It is understood that the foregoing detailed description is given merely by way of illustration and that many variations and modifications may be made therein without departing from the spirit of the invention.

The following examples are meant to illustrate, but not to limit the invention. All parts and percentages are by weight, unless otherwise specified.

EXAMPLE 1

This example illustrates our novel process for preparing our rare earth exchanged zeolite.

A total of 100 grams (dry basis) of Y zeolite having a silica to alumina ratio of 5.2 and commercially available from Union Carbide was exchanged three times with ammonium sulfate solutions using zeolite to ammonium sulfate to water weight ratios of 1:1:10, respectively. Each exchange was carried out at about 90° to 100°C for about 1 hour. The zeolite was filtered after each of the first two exchanges and placed in a fresh exchange solution. Each fresh exchange solution was of the same composition except that 9.25 grams of La(NO$_3$)$_3$.6H$_2$O was added to the third exchange solution. The product following the third exchange treatment was filtered, washed free of excess salts and calcined at 1400°F for 2 hours. The product at this point contained 3.5% lanthanum oxide and 3% Na$_2$O (dry basis).

The calcined zeolite was then exchanged two times in an ammonium sulfate solution using zeolite to ammonium sulfate to water weight ratio 1:2:20 respectively. All exchanges were carried out at a temperature of about 90°–100°C for about 1 hour. The zeolite was filtered after each exchange. It was then exchanged in a solution of rare earth chlorides using weight ratios zeolite to rare earth chloride (expressed as REO) to water 1:1:10 respectively. The exchange was for 1 hour at about 90°–100°C.

The product after the rare earth exchange was washed free of excess salts and dried and evaluated as the properties of the zeolite product identified as Sample A in Table I are compared with rare earth Y zeolites prepared by other prior art techniques.

The samples were prepared for catalytic cracking evaluation by mixing 10 percent of the zeolite with 90 percent of a commercially available semi-synthetic silica-alumina cracking catalyst containing about 60 percent amorphous silica-alumina and 40 percent clay. The resulting catalysts were pretreated by steaming at 1350°F. for a period of 16 hours in a 100 percent steam atmosphere. The catalytic evaluations were run at 900°F at a weight hourly space velocity of 16 using a light West Texas oil feed. In the Table I, Sample B is identified as the catalyst containing a calcined rare earth zeolite (CREY) having a higher rare earth content while Sample C is one having a similar rare earth content but made by conventional methods.

Table I

|  | Sample A | Sample B | Sample C |
|---|---|---|---|
| Na$_2$O, % | 0.29 | 0.3 | 0.3 |
| REO, % | 9.2 | 17.7 | 9.0 |
| Catalytic Activity |  |  |  |
| Conversion Volume, % | 71.0 | 71.0 | 62.0 |
| Coke, Weight % | 2.34 | 2.76 | 2.07 |
| Conversion/Coke | 30.4 | 25.7 | 30.0 |

These results demonstrate how the rare earth content can be reduced substantially without a loss in activity and at the same time improved coke selectivity is obtained.

EXAMPLE 2

This example shows another modification of our novel procedure.

Two samples of the type Y zeolite utilized in Example 1 were treated in a manner identical to that described in Example 1 through the point when the product had received the fifth exchange with (NH$_4$)$_2$SO$_4$ except that in this experiment, each of the samples were calcined at 1000°F for 3 hours. At this point the products identified as Sample D contained 3.5% REO and 3% Na$_2$O, while Sample E contained 3.5% REO and 3% Na$_2$O.

Following the fifth ammonium exchange the samples were subjected to a second calcination step. Sample D was calcined at 1100°F for 2 hours while the Sample E was calcined at 1400°F for 2 hours.

Following the second calcination, both samples were exchanged in solutions of rare earth chlorides in a manner identical to that described in Example 1. The products were then washed free of excess salts and dried. The properties of these samples are compared to zeolites of similar RE contact prepared by prior art methods as shown in Table II.

The catalyst samples utilized for catalytic cracking evaluation were prepared in the same manner as described in Example 1 and were subjected to the identical microactivity test described in Example 1. The catalyst Sample F and G were promoted with the zeolites prepared according to the process of U.S. Pat. No. 3,595,611.

Table II

|  | Sample D | Sample E | Sample F | Sample G |
|---|---|---|---|---|
| Na$_2$O, % | .17 | .21 | .20 | .10 |
| REO, % | 5.8 | 3.8 | 6.0 | 3.5 |
| Catalytic Activity |  |  |  |  |
| Conversion, |  |  |  |  |
| Volume % | 69.6 | 67.2 | 53.0 | 46.8 |
| Coke, Weight % | 2.0 | 1.3 | 1.32 | 1.14 |
| Conversion/ |  |  |  |  |
| Coke | 34.7 | 51.6 | 40.0 | 41.17 |

It can be seen from these results that this novel process results in zeolites of much higher activity than conventionally prepared zeolites of similar composition. The very good coke selectivity is also apparent. To appreciate this, it is necessary to be aware that the conversion/coke ratio generally decreases greatly with conversion level for conventional catalysts.

What is claimed is:

1. A process for the catalytic cracking of a hydrocarbon charge which comprises contacting said charge at a temperature of 800° to 1050°F. with a catalyst comprising a faujasitic crystalline aluminosilicate zeolite having a silica to alumina ratio of 3 to 6 in the stabilized rare earth form, said zeolite being prepared by a process which comprises the steps of:
   a. reducing the alkali metal oxide content of a faujasitic crystalline aluminosilicate zeolite to about 2.0 to 5.0 weight percent by ion exchanging with a solution containing a cation which upon thermal decomposition leaves a major portion of the zeolite in the hydrogen form,
   b. ion exchanging said zeolite with a solution containing a rare earth salt in a concentration sufficient to impart a rare earth oxide content of about 0.1 to 6.0 percent by weight of the zeolite,
   c. drying, calcining said exchanged zeolite at a temperature of from about 700° to 1650°F. for about 0.1 to 3.0 hours,
   d. further exchanging said zeolite with a solution containing rare earth salt to decrease the alkali metal oxide content to below about 1.0 weight percent about 1.0 to 10 percent by weight of the zeolite; and
   e. washing, drying and recovering the zeolite product and recovering the cracked hydrocarbon product.

2. The process of claim 1 wherein the catalyst includes 50 to 95% silica-alumina support.

3. The process of claim 1 wherein said hydrocarbon charge is contacted at a temperature of from about 800° to 1050°F.

4. The process of claim 1 wherein the alkali metal oxide is sodium oxide.

* * * * *

UNITED STATES PATENT AND TRADEMARK OFFICE
CERTIFICATE OF CORRECTION

PATENT NO. : 3,957,623
DATED : May 18, 1976
INVENTOR(S) : Carl Vance McDaniel and John Storey Magee, Jr.

It is certified that error appears in the above-identified patent and that said Letters Patent are hereby corrected as shown below:

In Claim 1, column 8, line 11: After "percent" and before "about" insert --and to impart a total rare earth oxide content of--.

Signed and Sealed this

Seventh Day of September 1976

[SEAL]

Attest:

RUTH C. MASON
*Attesting Officer*

C. MARSHALL DANN
*Commissioner of Patents and Trademarks*